May 8, 1951 W. J. TAYLOR 2,551,649
PROPELLER TEST UNIT
Filed July 15, 1949
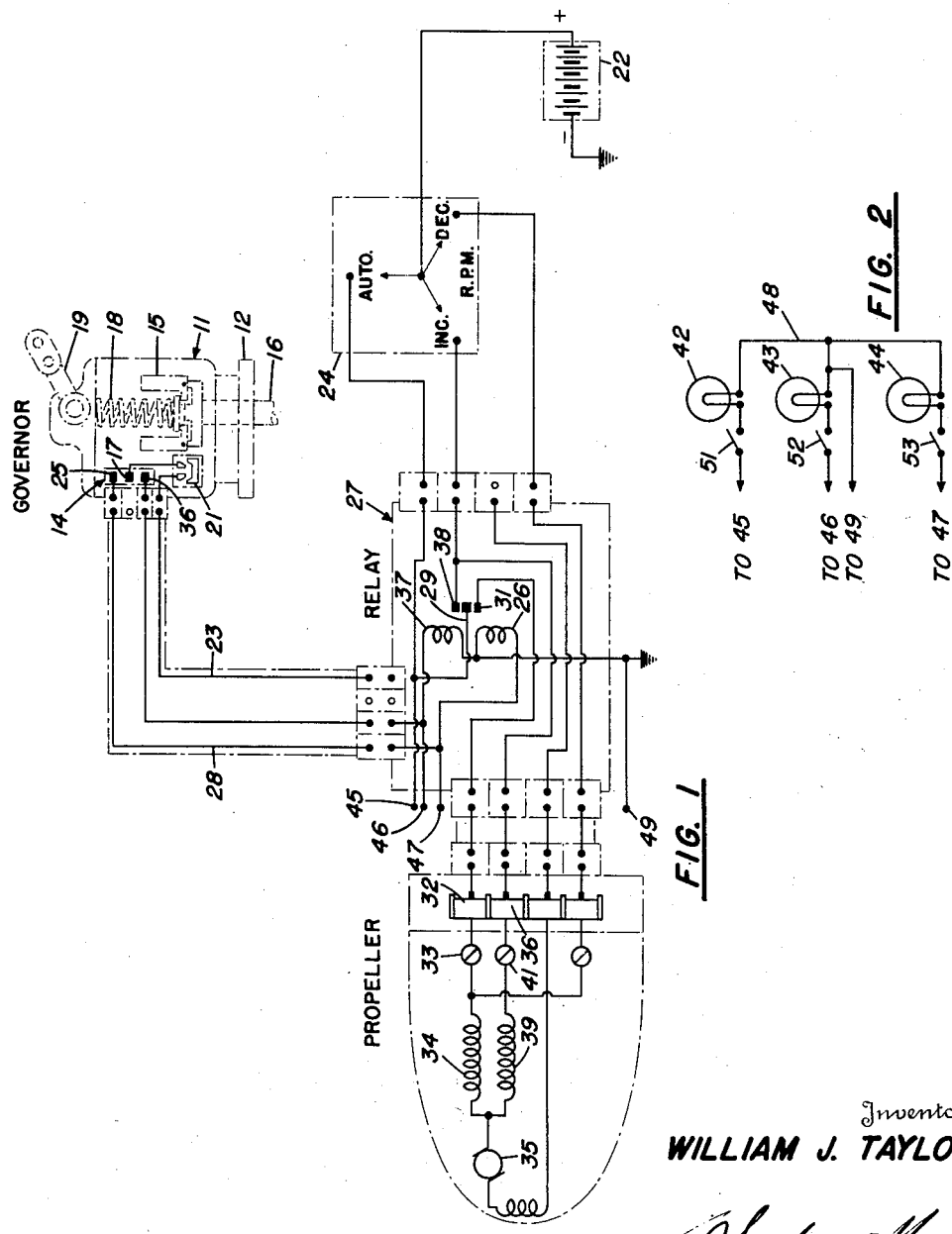
Inventor
WILLIAM J. TAYLOR
By
Attorney

UNITED STATES PATENT OFFICE 2,551,649

PROPELLER TEST UNIT

William J. Taylor, United States Navy

Application July 15, 1949, Serial No. 104,981

5 Claims. (Cl. 177—311)

(Granted under the act of March 3, 1883, as amended April 30, 1928; 370 O. G. 757)

The present invention relates to a propeller governor tester and more particularly to a propeller governor tester for testing a commercial governor control system of the proportional type generally employed in electric aircraft propellers.

The proportional type of governor control system generally employs a spring-loaded centrifugal type governor having an oil servo operated switch mechanism. The governor maintains the engine at a set constant speed by changing the propeller blade angle to correct for varying conditions of operation, such as engine power, airplane speed, and air density.

An object of the present invention is the provision of a testing unit for determining the proper functioning of the governor control system when operating in the automatic condition.

Another object is to provide a governor control system tester requiring a minimum number of parts, and having no moving elements.

A further object of this invention is the provision of a governor control system tester primarily designed for ground testing, but which may be permanently installed on the instrument panel of the aircraft.

Still another object is to provide a governor control system tester which is readily adaptable for testing the governor control systems of multi-engine aircraft.

The exact nature of this invention as well as other objects and advantages thereof will be readily apparent from consideration of the following specification relating to the annexed drawing in which:

Fig. 1 is a schematic wiring diagram of a proportional governor control system for a single engined aircraft illustrating the connections to be made to the testing unit of the present invention; and Fig. 2 is a wiring diagram of one form of testing unit according to this invention.

Referring now to the drawings, wherein like reference characters designate like or corresponding parts throughout the several views, there is shown on Fig. 1 a conventional proportional governor control system for an aircraft which includes a centrifugal type governor, generally designated 11, mounted on the governor drive pad 12 of the aircraft engine, not shown.

Basically, governor 11 is a single pole double throw switch 14 placed in the propeller circuit and operated automatically by the centrifugal force on flyweights 15 mounted on shaft 16 of the engine. Flyweights 15 are connected to a sliding valve, not shown, in a hollow portion of shaft 16 so that movement of flyweights 16 under centrifugal force creates a corresponding movement of the valve in shaft 16.

The sliding valve controls the operation of the oil servo-mechanism so that any change in the position of the valve directly affects the position of a servo-piston, not shown, which controls the operation of movable center contact 17 of switch 14. Thus, should the engine speed increase, flyweights 15 move outward under the additional centrifugal forces causing the valve to increase the pressure to the piston thereby moving contact 17 in the upward direction, as shown. Should the engine speed decrease, the opposite result would occur and contact 17 would consequently be moved downward.

A helical spring 18 counter-balances the flyweight forces so that at governing speed the sliding valve will supply only enough oil pressure to balance the servo-piston against its spring, not shown, thereby holding contact 17 in its neutral position. The condition of spring 18 is controlled by a suitable lever, not shown, in the cockpit of the aircraft, by means of linkage 19.

Since the pressure for the servo-mechanism of the governor is derived from the engine oil supply, and since the mechanism would cease to operate if a failure in the oil supply should occur, an oil pressure safety switch 21 is employed to automatically disconnect governor 11 from the propeller circuit upon such failure. In effect, switch 21 serves to disconnect contact 17 from the positive side of power supply 22, which is connected to line 23 when selector switch 24 is in the automatic position, so that the propeller blades will remain fixed at the angle they had at the time the failure or loss occurred. Opening of the automatic control circuit in this manner, however, does not affect the operation of the manual selective control system controlled by switch 24, as can be readily seen in Fig. 1.

In operation, assuming that the engine speed exceeds the control speed, contact 17 will move into engagement with upper contact 25, and a circuit through coil 26 of relay 27 will be completed through the positive end of supply 22, selector switch 24, line 23, switch 21, contact 17, contact 25, line 28, coil 26, and ground. Energization of coil 26 moves armature 29 into engagement with contact 31 thereby completing a circuit from supply 22, switch 24, armature 29, contact 31, slip ring brush 32, limit switch 33, motor field winding 34, motor armature 35, slip ring brush 36 and ground. Operation of motor 35 in this direction causes motor 35 to increase the blade angle of the propeller to thereby increase the load and decrease the speed of the engine.

When the engine speed is less than the control speed, contact 17 is moved into engagement with lower contact 36 of switch 14 to thereby energize coil 37 of relay 27 to connect armature 29 to contact 36. Under these conditions, field winding 39 of motor 35 is energized through limit switch 41 so as to drive motor 35 to decrease the blade angle resulting in decreased load on and increased speed of the engine.

In order to provide for proportional corrections of speed variations within a fine degree of sensitivity and to provide electrical contact between center contact 17 and either contact 25 or 36 of switch 14, contacts 25 and 36 are mounted on a shaft, not shown, which permits these contacts to oscillate up and down within a given range. This movement of contacts 25 and 36 is caused by having the mounting shaft on a cam, not shown, which is geared to shaft 16.

Contacts 25, 36 are originally spaced so as to permit them to oscillate by following the movements of the cam without touching contact 17 when contact 17 is in its neutral position. Should the engine speed increase or decrease slightly, contact 17 will move toward contact 36 or contact 25 and will engage one of the latter contacts momentarily each time the cam motion brings the one latter contact toward contact 17. Thus, for a slight increase or decrease in speed, the amount of blade angle correction brought about by momentary contact is sufficient to supply the exact correction for the off-speed condition.

For greater off-speed conditions, contact 17 will move farther toward either contact 25 or contact 36 thereby closing the associated circuit for a longer period, this engaging period increasing as the off-speed condition increases until finally the engagement is continuous. Thus, under the normal setting of the governor, when off-speed conditions exceed approximately 60 R. P. M. above speed or 90 R. P. M. below speed, continuous contact is established.

In order to efficiently and rapidly test the governor control system, the present invention provides the device disclosed in Fig. 2 which is appropriately connected to the system of Fig. 1, as set forth below. The testing device according to the present invention, comprises a plurality of indicator lamps 42, 43, 44, having one terminal connected to terminals 45, 46, 47, respectively, as shown in Fig. 1. The other terminal of each of lamps 42, 43, 44 is connected to a common lead 48 which in turn is connected to terminal 49 of Fig. 1, which represents the ground terminal of the system. Indicators 43 and 44 are preferably of different colors.

Inserted in series with each of lamps 42, 43, 44 are switches 51, 52, 53, respectively, these switches being provided mainly for permanent installation of the testing device in the instrument panel of the cockpit so that lamps 42, 43, 44 may be disconnected when the control system is not being tested.

From the above description, it can be seen that lamps 43 and 44 indicate the operation of the governor control system, lamp 43 being actuated each time contact 17 engages lower or increase contact 36, while lamp 44 is actuated by engagement of contacts 17 and 25. Lamp 42 is utilized to indicate the activation of power supply 22 and its application to the automatic control arrangement of the control system.

In ground testing operation, a variable-speed driving unit, not shown, is attached to shaft 16 through the intermediary of a mounting pad essentially similar to that of the engine, and oil is supplied to the system by any conventional oil supply system. Governor 11 is run at a speed which approximately equals that of the governor drive at the cruising speed of the engine on which the governor will be used, this speed being indicated by any suitable tachometer, not shown, drivingly connected to shaft 16.

Mechanism 19 is then adjusted so that spring 18 balances the centrifugal forces on flyweights 15 whereby contact 17 is retained in its central or neutral position. The speed of governor 11 is then increased until the actuation of decrease lamp 44 changes from intermittent to continuous and the tachometer reading at this point is noted. The speed of governor 11 is then decreased until the actuation of increase lamp 43 changes from intermittent to continuous, and the speed at this point is noted from the tachometer. The proportional range of governor 11 is determined by the difference between these readings, and the standard range is set at a maximum of 140 R. P. M. This range should be divided as 35 to 60 R. P. M. above the cruising speed before continuous operation of lamp 44, and 60 to 90 R. P. M. below cruising speed before continuous operation of lamp 43.

In this manner, appropriate adjustments may be readily made in the control system so that governor 11 meets the required standards. Furthermore, during ground testing or flight, the operation of the control system may be readily observed by actuation of the testing device. Thus, power failure will always be indicated by lamp 42, and any actual or apparent R. P. M. fluctuation can be readily ascertained. By proper use of the testing device, the exact cause of difficulty or malfunctioning of the control system may be readily determined.

Obviously many modifications and variations of the present invention are possible in the light of the above teachings. It is, therefore, to be understood that, within the scope of the appended claims, the invention may be practiced otherwise than as specifically described.

The invention described herein may be manufactured and used by or for the Government of the United States of America for governmental purposes without the payment of any royalties thereon or therefor.

What is claimed is:

1. For use with an aircraft governor control system including an engine, a propeller, motive means for varying the blade angle of the propeller to thereby vary the load and the speed of the engine, a power supply, relay means for alternatively connecting said supply to said motive means to drive said motive means in either direction, and a governor responsive to the variations in the speed of said engine on opposite sides of a predetermined value for energizing said relay means; testing apparatus comprising indicator means connected across said power supply for indicating the operation thereof, indicator means connected across said relay means for indicating the duration of energization thereof in one direction, and indicator means connected across said relay means for indicating the duration of energization thereof in the other direction.

2. Testing apparatus according to claim 1, and a switch connected in series with each of said indicator means.

3. For use with an aircraft governor control system including a relay having a pair of fixed contacts, a movable contact, and means for actuating the movable contact into engagement with either of the fixed contacts, a power supply having one terminal thereof connected to the movable contact, and a speed responsive governor responsive to variations in speed on opposite sides of a predetermined value for energizing the actuating means; testing apparatus comprising an indicator connected across said actuating means for indicating the duration of energization thereof in one direction, an indicator connected across said actuating means for indicating the duration of energization thereof in the opposite direction, and switch means connected in series with each of said indicators.

4. Testing apparatus according to claim 3, wherein said actuating means comprises a pair of coils and one indicator is connected across each coil.

5. Testing apparatus according to claim 4, and an indicator connected across said power supply.

WILLIAM J. TAYLOR.

REFERENCES CITED

The following references are of record in the file of this patent:

UNITED STATES PATENTS

| Number | Name | Date |
| --- | --- | --- |
| 1,356,804 | Brewer | Oct. 26, 1920 |
| 1,420,619 | Barton | June 27, 1922 |
| 1,726,994 | Murray | Sept. 3, 1929 |
| 2,385,525 | McCloy | Sept. 25, 1945 |